United States Patent
Dimmick et al.

(10) Patent No.: US 7,620,280 B2
(45) Date of Patent: Nov. 17, 2009

(54) FILLED CORE OPTICAL FIBER SPLICED TO OPTICAL FIBER AND METHOD OF MAKING THE SAME

(75) Inventors: Timothy E. Dimmick, Oviedo, FL (US); William E. Edwards, Jr., West Melbourne, FL (US); Douglas J. Markos, West Melbourne, FL (US); Peter S. Scheuter, Melbourne, FL (US); Kevin H. Smith, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 55 days.

(21) Appl. No.: 11/850,272

(22) Filed: Sep. 5, 2007

(65) Prior Publication Data

US 2009/0060429 A1    Mar. 5, 2009

(51) Int. Cl.
*G02B 6/02* (2006.01)
*G02B 6/38* (2006.01)
(52) U.S. Cl. .................................. 385/123; 385/65
(58) Field of Classification Search ............. 385/123, 385/65
See application file for complete search history.

(56) References Cited

U.S. PATENT DOCUMENTS

| 4,544,234 | A | 10/1985 | DeVeau, Jr. et al. |
| 6,836,606 | B2 | 12/2004 | Abeeluck et al. |
| 2004/0136670 | A1* | 7/2004 | Abeeluck et al. ............ 385/125 |
| 2004/0197043 | A1* | 10/2004 | Cyr et al. ....................... 385/12 |

* cited by examiner

*Primary Examiner*—Uyen-Chau N Le
*Assistant Examiner*—Kajli Prince
(74) *Attorney, Agent, or Firm*—Darby & Darby PC; Robert J. Sacco (57) ABSTRACT

A filled-core optical fiber (100) spliced to conventional, solid core optical transmission fiber (175) and a related method of making the same are provided. The optical fiber (100) comprises a core region (140), a cladding ring (120) enclosing the core region (120), and an outer cladding layer (160). A fill hole (115) is formed in the optical fiber (100) which extends from an outer sidewall (110) to the core region (140). The fill hole (115) is for introducing optical material (165) into the core region (140). The optical material (165) is introduced into the core region (140) after opposing ends (121, 122) of the optical fiber (100) are spliced to the free ends (176, 176) of conventional, solid core optical transmission fiber (175). The optical material (165) is introduced into core region (140) after splicing to avoid damage to the optical material (165) due to exposure to high temperatures generated during splicing.

20 Claims, 5 Drawing Sheets

FILLED CORE OPTICAL FIBER SPLICED TO OPTICAL FIBER AND METHOD OF MAKING THE SAME

STATEMENT REGARDING FEDERALLY SPONSORED RESEARCH OR DEVELOPMENT

This invention was made with government support. The government has certain rights in the invention as specified in FAR 52.227-12.

BACKGROUND OF THE INVENTION

1. Statement of the Technical Field

The invention relates to optical fibers. More particularly, the invention relates to a filled-core optical fiber spliced to a standard optical transmission fiber and a method of making the same.

2. Background of the Invention

Optical fibers are often used in systems for data transmission applications and sensing applications. These systems require the use and mating of optical fibers extending from various sources. Such sources include data sources and light sources. In such applications, an optical fiber is sometimes used for providing a capillary waveguide. The capillary waveguide could be spliced to a standard optical transmission fiber coupled to a data or light source. The capillary waveguide provides additional capabilities in optical communications and sensing applications as compared to a standard optical fiber device. Such capabilities include filtering capabilities and parameter of interest measuring capabilities.

As should be understood, the capillary waveguide is an optical fiber having a hollow core. The hollow core is filled with a fluid having one or more desired optical properties. For example, the fluid has an index of refraction that varies in accordance with changes in temperature. In an optical fiber having a grating disposed in the cladding region adjacent the hollow core, the wavelengths of light that are able to pass through the core depend on the index of refraction of the fluid. Similarly, the wavelengths of light that are able to be reflected by the core depend on the index of refraction of the fluid. As such, the optical properties of the core can be controlled by selectively varying the temperature of the fluid. In addition, a parameter of interest, such as the temperature of the fluid can be measured by detecting the wavelengths of light that have passed through the core. Likewise, the parameter of interest can be measured by detecting the wavelengths of light that have been reflected by the core.

It should be noted that there is great difficulty associated with splicing opposing ends of a filled-core optical fiber with a standard optical transmission fiber. In this regard, it should be understood that optical fibers have relatively small dimensions and cross-sectional areas. As such, the splicing of two (2) optical fibers is accomplished by precisely aligning their axis so as to minimize losses. The splicing generally involves employing a mechanical splice technique or a fusion splice technique.

The mechanical splice technique generally involves utilizing a mechanical splice to physically hold the ends of the optical fibers together. The mechanical splice provides a means to secure the optical fibers in an axially aligned configuration. Mechanical splices have been found to be effective in maintaining the alignment of the optical fibers. However, the splice resulting from said mechanical splice technique suffers from being less robust than desired and typically has a higher insertion loss than a fusion splice.

The fusion splice technique generally involves aligning opposing ends of an optical fiber with the ends of conventional, solid core optical transmission fiber. Thereafter, the fusion splice technique involves performing actions to melt the adjacent ends of the optical fibers together. The melting can be accomplished utilizing a flame, an electric arc or the like. Despite the advantages of the fusion splicing technique, it suffers from certain drawbacks. For example, the optical fibers are exposed to high temperatures during the fusion splicing technique. The high temperatures can damage the optical properties of a fluid contained within an optical fiber. As such, the types of fluids that can be selected for use in communications and sensing applications are limited.

In view of the foregoing, there remains a need for an improved filled-core optical fiber arrangement and method of making the same that avoids exposing the fluid in the core to high temperatures generated during splicing that could damage the optical properties of the fluid.

SUMMARY OF THE INVENTION

The invention relates to a filled-core optical fiber spliced on opposing ends to conventional, solid core optical transmission fiber. The filled-core optical fiber is comprised of a core region containing an optical material. The filled-core optical fiber is also comprised of at least one optical cladding layer. The optical cladding layer includes a cladding ring disposed on the core region. The filled-core optical fiber is further comprised of a fill hole extending from an outer sidewall of the optical fiber to the core region. The fill hole is configured for inserting the optical material into the core region. The optical material can be selected as a fluid or a solid.

According to an aspect of the invention, a fusion splicing technique is employed for splicing the ends of the filled-core optical fiber to the ends of the conventional, solid core optical transmission fiber. Subsequent to splicing the ends of the filled-core optical fiber to the ends of the conventional, solid core optical transmission fiber, the optical material is inserted through the fill hole and into the core region. The fill hole is formed in the optical fiber by a focused ion beam, an excimer laser or other means. The fill hole is sealed subsequent to inserting the optical material into the core region.

According to another aspect of the invention, an optical fiber is advantageously constructed with a cladding ring having an index of refraction lower than the index of refraction of an outer cladding layer. It is also advantageous to avoid the possible collapse of the cladding ring and core region due to the high temperatures generated during the splicing process. The collapse of the cladding ring and core region is avoided by: (a) using a specialized splice recipe; and/or using an inert gas technique. The inert gas is flowed through the core region prior to splicing the ends of the filled-core optical fiber to the ends of conventional, solid core optical transmission fiber. The inert gas is nitrogen, argon or any other suitable inert gas. Subsequent to the splicing process, the optical fiber is placed under a vacuum. The core region is filled by wicking the optical material through the fill hole.

According to another aspect of the invention, an optical fiber is advantageously constructed with a cladding ring having an index of refraction higher than the index of refraction of an outer cladding layer. A fusion splicing technique is employed for splicing opposing ends of the filled-core optical fiber to ends of conventional, solid core optical transmission fiber. During the fusion splicing technique, portions of the cladding ring and core region collapse. A sealed core portion is formed between the opposing collapsed portions of the core region. The sealed core portion is a portion of the core region filled with the optical material.

In addition, tapered core portions are formed on opposing sides of the sealed core portion. At least one tapered core portion is provided for ensuring the adiabatic transition of light propagating from a transmission core of the conventional, solid core optical transmission fiber to the sealed core potion. Similarly, at least one tapered core portion is provided for ensuring the adiabatic transition of light propagating from the sealed core portion to the transmission core of the conventional, solid core optical transmission fiber. The optical fiber is placed under a vacuum. The sealed core portion is filled with an optical material. The optical material is wicked through the fill hole. The fill hole is sealed with a sealing means after the optical material is introduced into the sealed core portion of the core region.

In another aspect of the invention, an optical fiber is advantageously constructed having an cladding ring with an index of refraction higher than outer cladding ring. Such an optical fiber is spliced to conventional, solid core optical transmission fiber while avoiding collapsing the cladding ring and the core region. The collapse of the cladding ring and core region is avoided by: (a) using a specialized splice recipe; and/or (b) using an inert gas technique.

Alternately, an optical fiber is advantageously constructed with a cladding ring having an index of refraction lower than the outer cladding ring. Such an optical fiber is spliced to conventional, solid core optical transmission fiber and has a sealed core portion formed during the fusion splicing process. The sealed core portion is formed between collapsed portions of the optical cladding ring and the core region during the fusion splicing process. The sealed core portion includes tapered core portions which are also filled with the optical material.

According to another aspect of the invention, a method of making a filled-core optical fiber spliced to an optical transmission fiber is provided. The method includes the step of providing a core region in the filled-core optical fiber. The method also includes the step of defining at least one optical cladding layer in the filled-core optical fiber. The optical cladding layer is comprised of a cladding ring disposed on the core region. The optical cladding ring is selected to have an index of refraction higher than an index of refraction of the outer cladding layer. Alternately, the optical cladding ring is selected to have an index of refraction lower than the index of refraction of the outer cladding layer.

The method further includes the step of forming a fill hole in the filled-core optical fiber extending from an outer sidewall of the optical fiber to the core region. A focused ion beam, an excimer laser or other means is utilized for forming the fill hole in the filled-core optical fiber. The optical material is selected to be a fluid or a solid.

The method further includes the step of splicing opposing ends of the filled-core optical fiber to ends of conventional, solid core optical transmission fiber. The method also includes the step of utilizing a fusion splice technique for splicing the opposing ends of the optical fiber to the ends of conventional, solid core optical transmission fiber. During the fusion splicing technique, the collapse of the cladding ring is possible and desired in selected constructions of the optical fiber. In selected other constructions of the optical fiber, it is advantageous to avoid the collapse of cladding ring of the optical fiber. The collapse of the cladding ring is avoided by: (a) using a specialized splice recipe; and/or (b) flowing inert gas through the core region during the splicing process. If selected, the inert gas is flowed through the core region prior to splicing opposing ends of the filled-core optical fiber to ends of conventional, solid core optical transmission fiber.

The method further includes the step of filling the core region with an optical material. This step is performed subsequent to splicing opposing ends of the filled-core optical fiber to the ends of the optical transmission fiber. The method also includes the step of placing the optical fiber under a vacuum. The method further includes the step of wicking the optical material through the fill hole and into the core region. The method includes the step of sealing the fill hole subsequent to filling the core region with the optical material.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
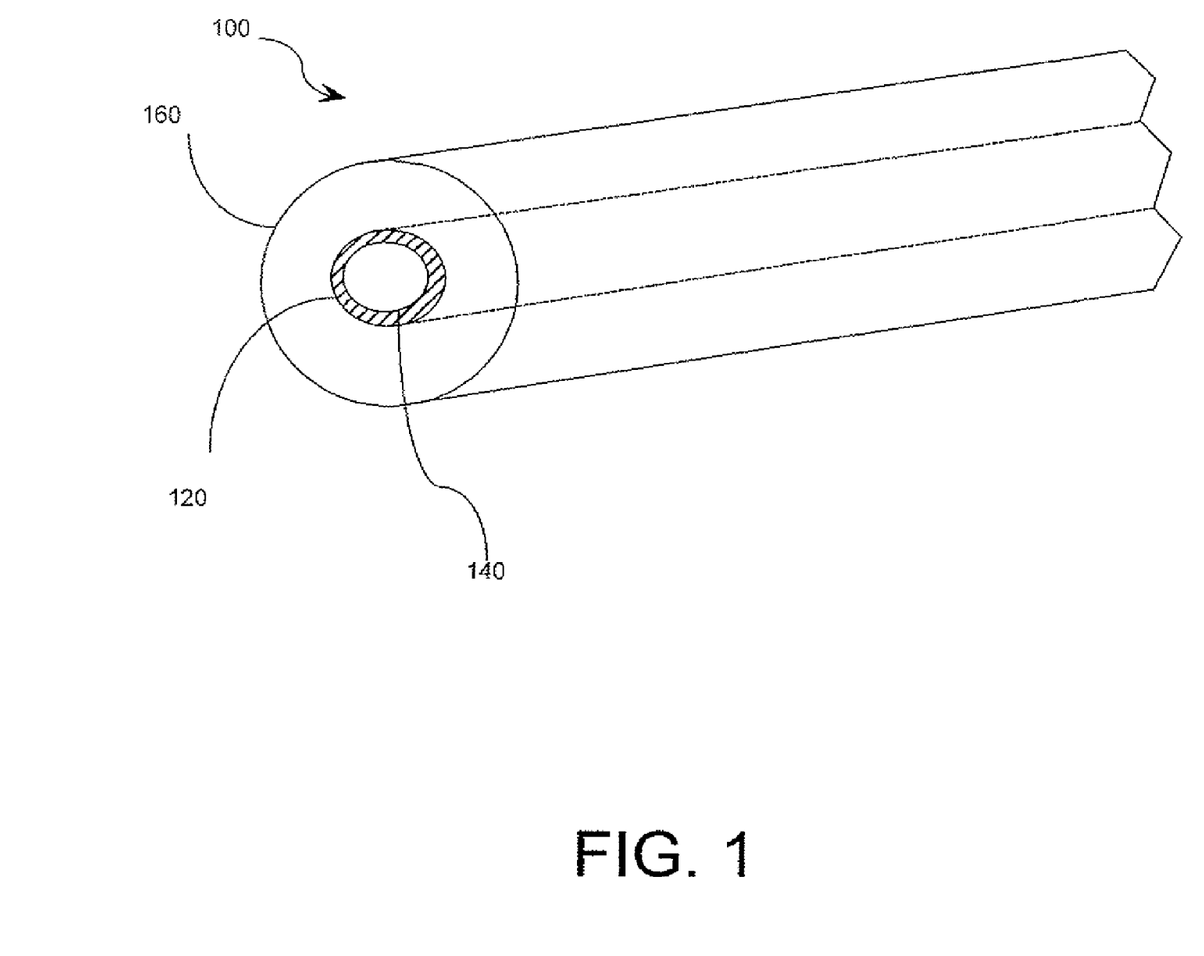
FIG. 1 is a perspective view of a hollow-core optical fiber that is useful for understanding the invention.

Referring now to FIG. 1, there is provided a perspective view of a hollow-core optical fiber 100 that is useful for understanding the invention. The optical fiber 100 has a hollow core region 140. The hollow core region or bore 140 can be advantageously filled with an optical material. Due to the inherent properties of the optical material, the optical fiber 100 can be used in a wide variety of applications. Such applications include, but are not limited to, a data transmission application and a sensing application.

It should be noted that the optical material is selected to have desired optical properties suitable for a particular application. For example, the optical material is selected as a fluid having a variable index of refraction. The index of refraction can be selectively varied by changing the fluid's temperature. In such a scenario, and when a grating is disposed in the cladding of the optical fiber, wavelengths of light to be transmitted through or reflected by the optical fiber 100 can also be selectively varied by changing the fluid's temperature. Still, the invention is not limited in this regard. For example, the optical material can alternatively be selected as a solid material or any other suitable material having a variable index of refraction.

Such a variable configuration provides an optical fiber 100 that is useful in a variety of data transmission applications. Some data transmission applications are described in U.S. patent application Ser. Nos. 11/538,947 and 11/538,930 assigned to the Harris Corporation of Melbourne, Fla. Both of these disclosures are fully incorporated herein by reference. It should be noted that the present invention is not limited to the uses described in the foregoing U.S. Patent Applications.

Rather, the present invention can be used in any suitable data transmission application known in the art.

Such a variable configuration also provides an optical fiber 100 that is useful in a variety of sensing applications. One sensing application includes determining a parameter of interest in proximity to the optical fiber 100. The parameter of interest is determined by detecting changes in the properties of light transmitted through or reflected by the optical fiber 100. Still, the invention is not limited in this regard. For example, the optical fiber 100 can also be used in the sensing applications described in U.S. patent application Ser. No. 11/538,954 assigned to the Harris Corporation of Melbourne, Fla.

Referring again to FIG. 1, the optical fiber 100 is comprised of a cladding ring 120 surrounding the hollow core region 140. The cladding ring 120 has an index of refraction $n_{ring}$. The optical fiber is also comprised of an outer cladding layer 160. The outer cladding layer 160 encloses the cladding ring 120. The outer cladding layer 160 has an index of refraction $n_{clad}$ that may be higher or lower than the index of refraction of the cladding ring 120. Various conventional materials, such as germanium or fluorine doped silica and silica, may be used to form the cladding ring 120 and the outer cladding layer 160, respectively. It is known that silica has an index of refraction of approximately one and four tenths (1.444) at a wavelength of 1.55 micrometers. Still, the invention is not limited in this regard.

It should be appreciated that the hollow-core fiber 100 may have a geometry different from the geometry shown in FIG. 1. The hollow-core fiber 100 may also have a greater number of cladding layers and outer protective layers than those 120,160 shown in FIG. 1. It should also be appreciated that the hollow core region 140 has an index of refraction $n_{core}$ that is variable when filled with an optical material as described herein below.

Figure 2:
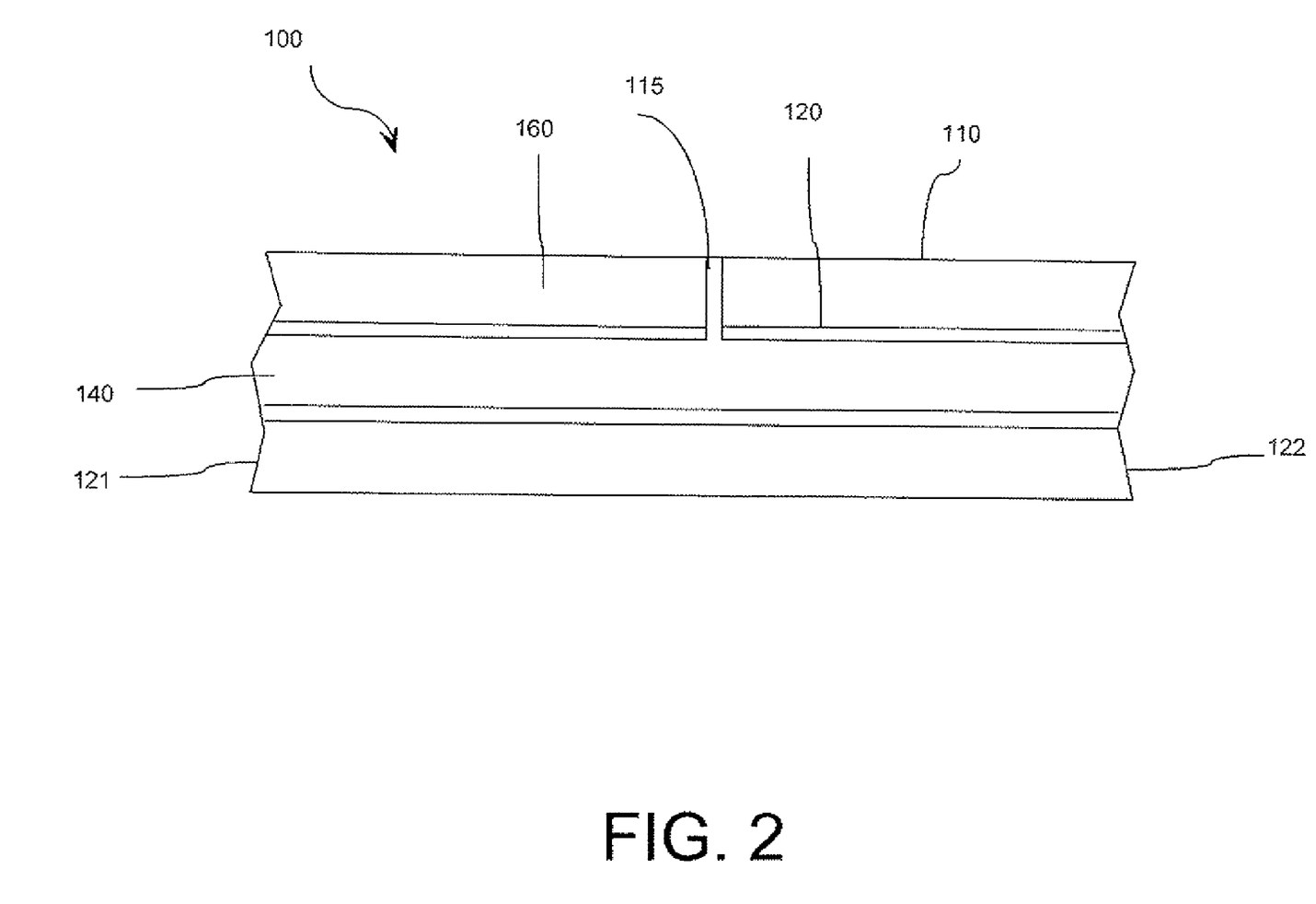
FIG. 2 is a cross-sectional view of the hollow-core optical fiber of FIG. 1 having a small fill hole extending from an outer sidewall to a hollow core region.

Referring now to FIG. 2, there is provided a cross-sectional view of the hollow-core optical fiber 100 having a fill hole 115 extending from an outer sidewall 110 to the core region 140. The fill hole 115 is provided for inserting the optical material into the core region 140. The fill hole 115 can be formed in the optical fiber 100 either before or after splicing the ends 121, 122 of the optical fiber 100 to a conventional, solid core optical transmission fiber. The fill hole 115 can be formed in the optical fiber 100 utilizing any suitable means. Such means include, but are not limited to, a focused ion beam or an excimer laser.

Figure 3:
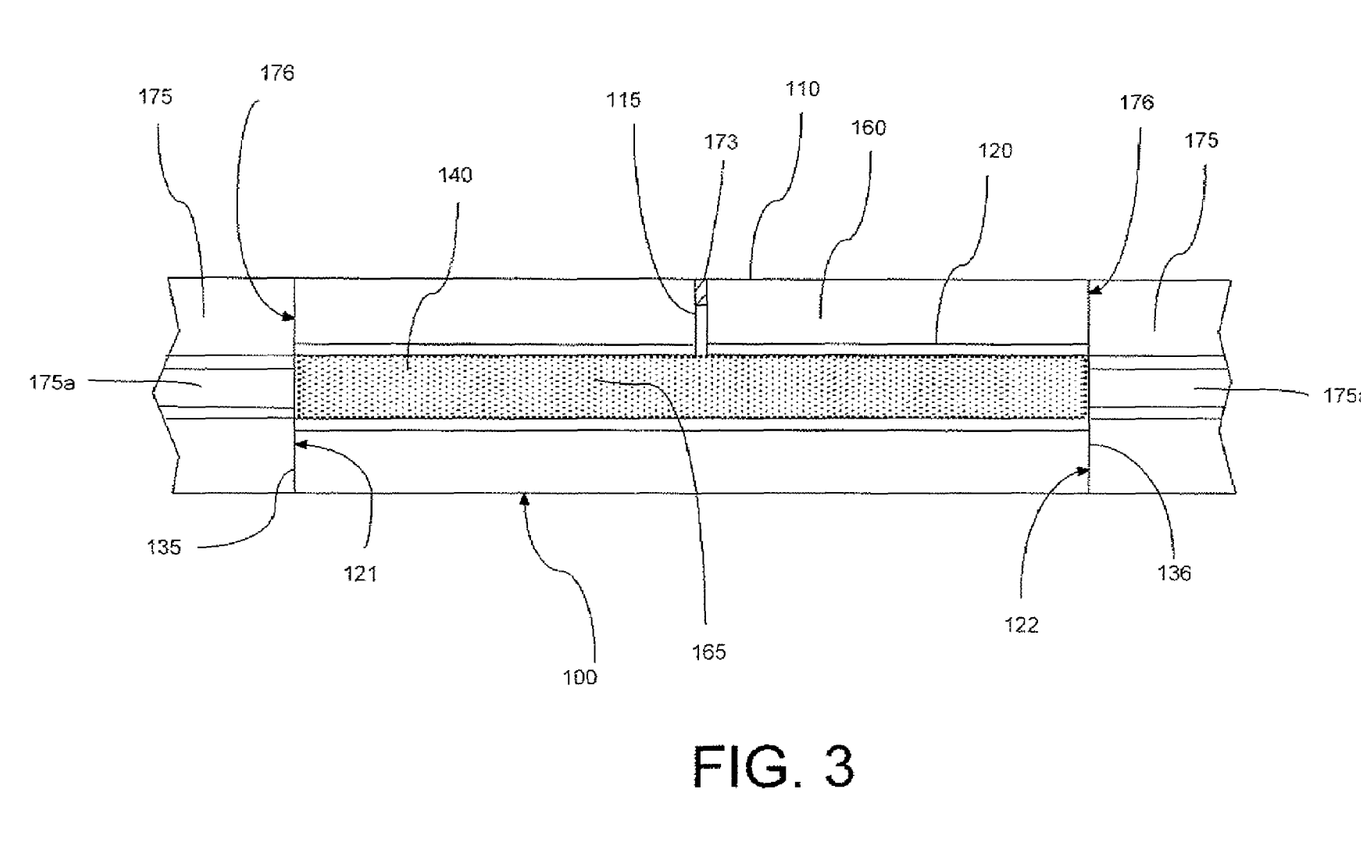
FIG. 3 is a cross-sectional view of the optical fiber of FIG. 2 spliced on opposing ends to a standard optical transmission fiber.

Referring now to FIG. 3, there is provided a cross-sectional view of the optical fiber 100 spliced on opposing ends 121, 122 to the ends 176, 176 of a conventional, solid core optical transmission fiber 175. Prior to splicing, the opposing ends 121, 122 of the optical fiber 100 are aligned with the ends of the conventional, solid core optical transmission fiber 175. The core region 140 is also aligned with the respective optically transmissive core 175a of the optical transmission fiber 175.

The opposing ends 121, 122 can be spliced to the ends 176, 176 of the conventional, solid core optical transmission fiber 175 using a fusion splicing technique. The fusion splicing technique involves the use of a fusion splicing machine. Fusion splicing machines are well known to persons skilled in the art, and therefore will not be described in great detail herein. The fusion splicing technique also involves steps for generating splicing temperatures on the order of one thousand eight hundred degrees Celsius (1800° C.). It should be noted that portions of the cladding ring 120 and core region 140 may collapse under such extreme temperatures.

It may be advantageous to avoid such a collapse when the cladding ring 120 has a lower refractive index than the outer cladding layer 160. In this regard, it should be appreciated that a collapsed lower index cladding ring 120 is not suited to guiding light. It should also be appreciated that the resulting splice is prone to high loss. The collapse of the components 120, 140 can be avoided by: (a) using a specialized splice recipe; and/or (b) using an inert gas technique.

Such a specialized splice recipe can involve the step of setting the controls of a splicing machine to use a pulsing arc. The pulsing arc can provide a means for increasing the temperature of the outer surfaces of the optical fiber 100 and the outer surfaces of the conventional, solid core optical transmission fiber 175. The pulsing arc can also provide a means for preventing a substantial change in temperature within the interior of the optical fiber 100. As such, a splice can be formed without a resulting collapse of the optical cladding ring 120 and/or core region 140.

The inert gas technique can involve the step of pumping an inert gas through the core region 140. This pumping step is performed to avoid a collapse of the cladding ring 120 during a splicing process. The inert gas can include, but is not limited to, nitrogen and argon. The inert gas may be inserted into the core region 140 utilizing any means known in the art. For example, the inert gas is inserted into one end of the core region 140. Alternatively, the inert gas is inserted into the core region 140 via the fill hole 115.

After a splicing process is complete, the optical fiber 100 is placed under a vacuum and the fluid 165 is wicked through the fill hole 115. Thereafter, the fill hole 115 could be sealed by a sealing means 173. Such a sealing means 173 includes, but is not limited to, applying and curing an epoxy sealant, filling the fill hole 115 with a glass solder. or locally heating the outer face of the fill hole 115 to collapse the fill hole 115 at the outer surface of the optical fiber 100.

Figure 4:
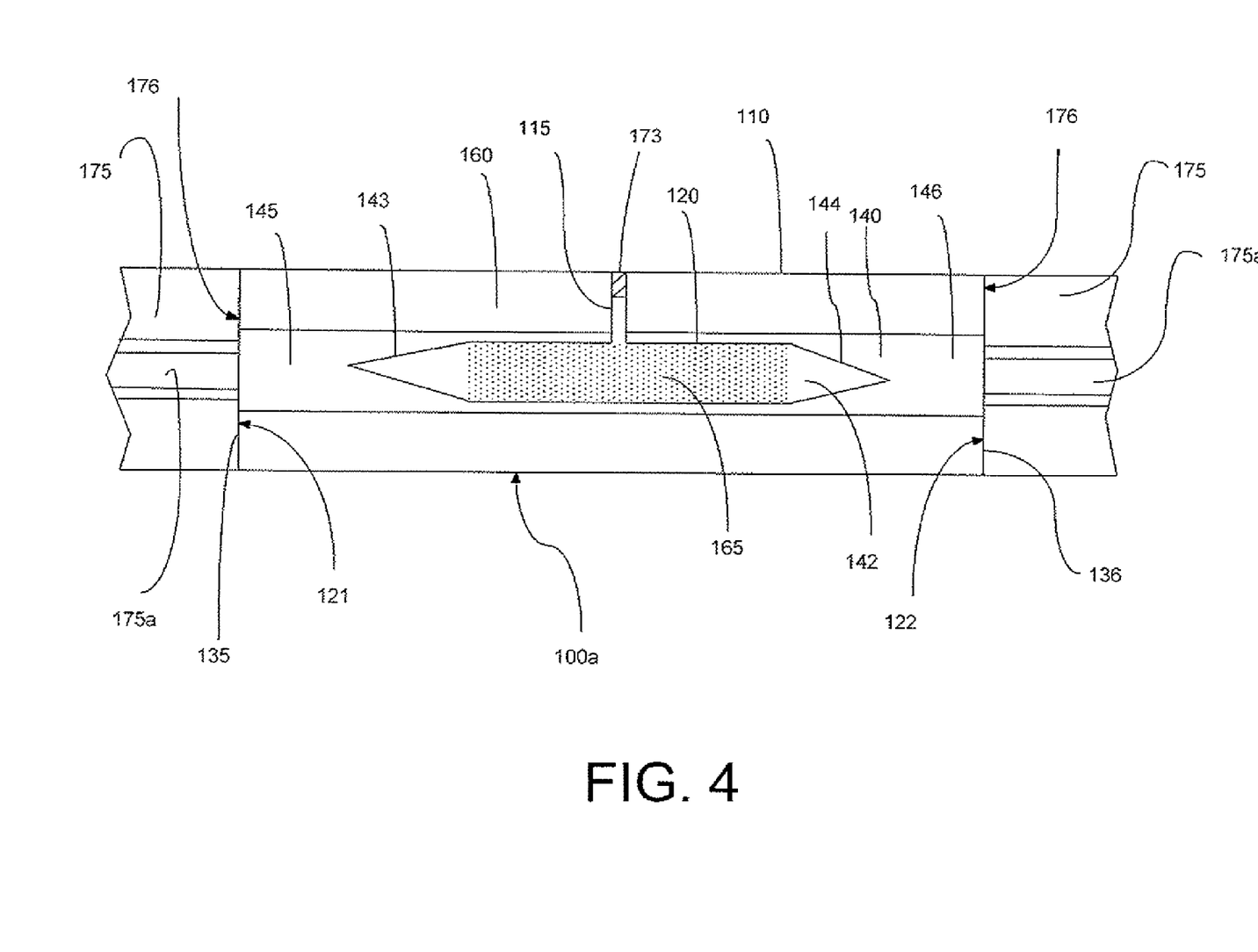
FIG. 4 is a cross-sectional view of the optical fiber of FIG. 2 spliced on opposing ends to a standard optical transmission fiber and having a collapsed cladding ring and a hollow core region.

Referring now to FIG. 4, there is provided a cross-sectional view of a hollow-core optical fiber 100a similar to optical fiber 100 of FIGS. 1-3. The optical fiber 100a has opposing ends 121, 122 spliced to the ends 176, 176 of conventional, solid core optical transmission fiber 175. Prior to splicing, the opposing ends 121, 122 are aligned with the ends 176, 176 of the conventional, solid core optical transmission fiber 175. The core region 140 is also aligned with the respective transmissive core 175a of the optical transmission fiber 175. Such an optical fiber 100a could have an index of refraction of the cladding ring 120 that is higher than the outer cladding layer 160.

As shown in FIG. 4, there is a sealed core portion 142 formed from a portion of the core region 140. The sealed core portion 142 is formed between the collapsed portions 145, 146 of the core region 140. The collapsed portions 145, 146 and the sealed core portion 142 were formed during a fusion splicing process. It should be noted that the collapse of the cladding ring 120 can be directed by controlling the power applied to a splicing filament of a splicing machine as it is moved along the length of the optical fiber 100a. Splicing filaments are well known to persons skilled in the art, and therefore will not be described in great detail herein. It should also be noted that the collapsed portions 145, 146 of the core region 140 retain the ability to guide light when the cladding ring 120 has an index of refraction higher than the index of refraction of the outer cladding layer 160. It should further be noted that the splice between the optical fiber 100a and the conventional, solid core optical transmission fiber 175 is a low loss splice.

As shown in FIG. 4, the tapered core portions 143, 144 are formed on opposing sides of the sealed core portion 142. The opposing tapered core portions 143, 144 extend in the direction of the respective collapsed portions 145, 146. The purpose of the tapered core portions 143, 144 will become more evident as the discussion progresses.

The sealed core portion 142 is formed prior to being filled with the optical material 165 through the fill hole 115. This is to avoid the optical material 165 from being damaged by the high temperatures generated during the fusion splicing process. For example, if the optical material 165 is a fluid, then the optical properties of the fluid can be damaged by exposure to high temperature. As such, the fluid 165 is inserted into the sealed core portion 142 only after the fusion splicing process has been completed. Still, the invention is not limited in this regard.

Subsequent to completing a fusion splicing process, the sealed core portion 142 is filled with the fluid 165 through the fill hole 115. The sealed core portion 142 is filled with fluid 165 by placing the optical fiber 100a under a vacuum and wicking the fluid 165 through the fill hole 115. The optical fiber 100a can be placed under the vacuum utilizing any means known in the art. Thereafter, the fill hole 115 could be sealed by a sealing means 173. Such a sealing means 173 includes, but is not limited to, applying and curing an epoxy sealant, filling the fill hole 115 with a glass solder, or locally heating the outer face of the bore 115 to collapse the fill hole 115 at the outer surface of the optical fiber 100.

Referring again to FIG. 4, the sealed core portion 142 includes the tapered core portions 143, 144 which are also filled with the optical material 165. The tapered core portions 143, 144 are adiabatically tapered transition regions between the optical transmission fiber 175 and the optically transmissive sealed core portion 142. The tapered core portions 143, 144 were created by controlling the temperature during the fusion splicing process to control the length of the tapered transition regions. The presence of the adiabatic tapered portion 143 ensures that the light propagating through the transmissive core 175a of the optical transmission fiber 175 will evolve with low loss as the light propagates through the collapsed bore portion 145 into the sealed core portion 142. Similarly, the presence of the tapered core portion 144 ensures low loss evolution of the light as it exits the sealed core portion 142 and propagates through the collapsed bore portion 146 to the optically transmissive core 175a.

In another aspect of the invention, it should be appreciated by one of ordinary skill in the art that an optical fiber similar to the one shown in FIGS. 1-3 could be advantageously constructed having an cladding ring 120 with an index of refraction higher than outer cladding ring 160. Such an optical fiber 100 could be spliced to conventional, solid core optical transmission fiber 175 while avoiding collapsing the cladding ring 120 and the core region 140. The collapse of the components 120, 140 can be avoided by: (a) using a specialized splice recipe; and/or (b) using an inert gas technique as previously described.

Alternately, it should be appreciated by one of ordinary skill in the art that an optical fiber similar to the one shown in FIG. 4 could be advantageously constructed having a cladding ring 120 with an index of refraction lower than outer cladding ring 160. Such an optical fiber 100 could be spliced to conventional, solid core optical transmission fiber 175 and have a sealed core portion 142 formed during the fusion splicing process. The sealed core portion 142 is formed between collapsed portions 145, 146 of the components 120, 140 during the fusion splicing process. The sealed core portion 142 includes the tapered core portions 143, 144 which are also filled with the optical material 165.

Such an optical fiber could have application when a conventional, solid core optical transmission fiber 175 is spliced to an optical fiber with a much smaller core region and a very high index fluid in the bore. For the best transmission of light through a splice, it is desirable to match the mode fields on either side of the splice. In order to match the size of the mode fields in the optical fiber to that of the conventional, solid core optical transmission fiber, the high index core region in the optical fiber may need to be made very small right at the splice. The diameter of the core region would gradually taper from the splice to the full diameter of the sealed core portion 142 so that the mode can adiabatically transition from its shape at the splice to the much smaller mode that exists in the optical fiber. The decision to collapse or not collapse the cladding ring 120 depends on the need to match the mode size with the conventional, solid core optical fiber 175. Collapsing the bore 140 in this manner may have applications with either high or low index cladding rings 120.

Figure 5:
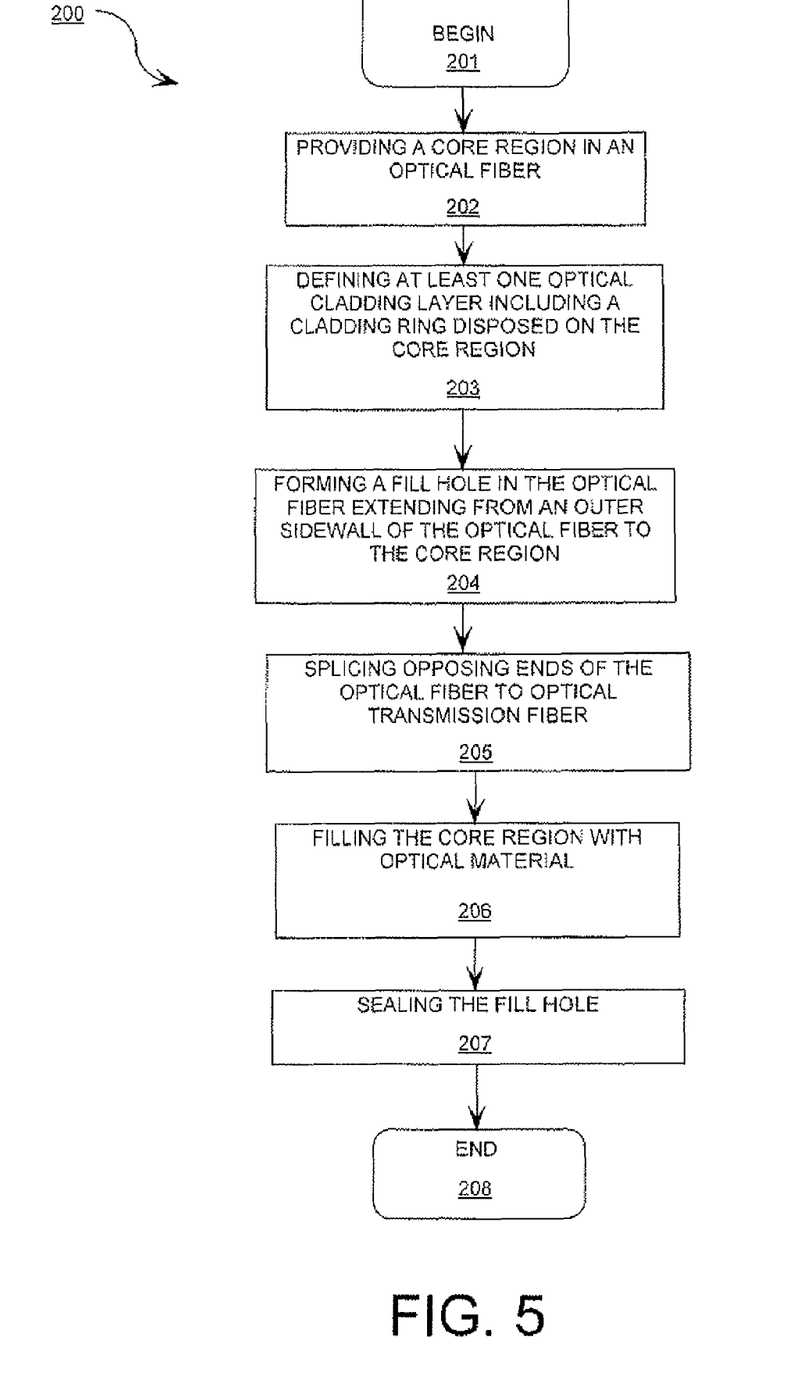
FIG. 5 is a flow diagram of a method for making a filled-core optical fiber spliced to a conventional, solid core optical transmission fiber.

Referring now to FIG. 5, there is provided a flow diagram of a method 200 for making the filled-core optical fiber 100 of FIGS. 2-4. As shown in FIG. 5, the method begins with step 201 and continues to step 202. In step 202, a core region 140 is provided in an optical fiber 100. Thereafter, step 203 is performed where at least one optical cladding layer is defined in the optical fiber 100. The optical cladding layer includes a cladding ring 120 disposed on the core region 140. Step 203 can involve enclosing the cladding ring 120 with an outer cladding layer 160. Step 203 can further involve selecting the optical cladding ring 120 to have an index of refraction higher than an index of refraction of the outer cladding layer 160. Alternately, step 203 can further involve selecting the optical cladding ring 120 to have an index of refraction lower than an index of refraction of the outer cladding layer 160.

Subsequent to step 203, the method 200 continues with step 204. In step 204, a fill hole 115 is formed in the optical fiber 100. The fill hole 115 extends from an outer sidewall 110 of the optical fiber 100 to the core region 140. Step 204 can involve utilizing a focused ion beam or excimer laser for forming the fill hole 115 in the optical fiber 100.

The method continues with step 205. In step 205, opposing ends 121, 122 of the optical fiber 100 or optical fiber 100a are spliced to ends 176, 176 of the conventional, solid core optical transmission fiber 175. Step 205 can involve using a fusion splicing technique for splicing the opposing ends 121, 122 of the optical fiber 100 or optical fiber 100a to ends 176, 176 of conventional, solid core optical transmission fiber 175. During the fusion splicing technique, the cladding ring 120 of optical fiber 100a collapses. It is advantageous to avoid the collapse of cladding ring 120 of optical fiber 100. The collapse of the cladding ring 120 can be avoided by: (a) using a specialized splice recipe; and/or (b) flowing inert gas through the core region 140 during the splicing process.

After step 205, the method 200 continues with step 206. In step 206, the core region 140 is filled with an optical material 165. The optical material 165 is selected to be a fluid or a solid material. Step 206 can involve placing the optical fiber 100 or the optical fiber 100a under a vacuum and wicking the fluid 165 through the fill hole 115.

After step 206, the method continues with step 207. In step 207, the fill hole 115 is sealed with a sealing means 173. The sealing means 173 includes, but is not limited to, applying and curing an epoxy sealant, filling the till hole 115 with a glass solder, or locally heating the outer face of the fill hole 115 to collapse the fill hole 115 at the outer surface of the optical fiber 100.

Subsequent to step 207, step 208 is performed where the method 200 ends.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A filled-core optical fiber, comprising:
   a core region containing an optical material;
   at least one optical cladding layer including a cladding ring disposed on said core region; and
   a fill hole formed in said filled-core optical fiber extending from an outer sidewall of said filled-core optical fiber to said core region for inserting said optical material into said core region, said fill hole having at least one sealing means formed in at least a portion of said fill hole, wherein said cladding ring has an index of refraction lower than the index of refraction of an outer cladding layer.

2. The optical fiber according to claim 1, wherein said optical material is a fluid.

3. The optical fiber according to claim 1, wherein said optical material is a solid.

4. The optical fiber according to claim 1, wherein said sealing means comprises at least one of an epoxy sealant applied to said fill hole and a glass solder filling said fill hole.

5. The optical fiber according to claim 1, wherein said sealing means comprises a collapsed portion of said fill hole at said outer sidewall.

6. A filled-core optical fiber, comprising:
   a core region containing an optical material;
   at least one optical cladding layer including a cladding ring disposed on said core region; and
   a fill hole formed in said filled-core optical fiber extending from an outer sidewall of said filled-core optical fiber to said core region, said fill hole inserting said optical material into said core region,
   wherein said fill hole inserts said optical material into said core region after opposing ends of said filled-core optical fiber are spliced to opposing ends of an optical transmission fiber, and
   wherein said cladding ring has an index of refraction lower than the index of refraction of an outer cladding layer and a sealed core portion is formed between opposing collapsed portions of the core region.

7. A filled-core optical fiber, comprising:
   a core region containing an optical material;
   at least one optical cladding layer including a cladding ring disposed on said core region; and
   a fill hole formed in said filled-core optical fiber extending from an outer sidewall of said filled-core optical fiber to said core region, said fill hole inserting said optical material into said core region,
   wherein said fill hole inserts said optical material into said core region after opposing ends of said filled-core optical fiber are spliced to opposing ends of an optical transmission fiber, and
   wherein said cladding ring has an index of refraction lower than the index of refraction of an outer cladding layer and said core region does not collapse during splicing.

8. A method of making a filled-core optical fiber spliced to an optical transmission fiber, comprising the steps of:
   providing a core region in a filled-core optical fiber;
   defining at least one optical cladding layer in said filled-core optical fiber including a cladding ring disposed on said core region;
   forming a fill hole in said filled-core optical fiber extending from an outer sidewall of said filled-core optical fiber to said core region;
   splicing opposing ends of said filled-core optical fiber to a set of ends of an optical transmission fiber; and
   filling said core region with an optical material after opposing ends of said filled-core optical fiber are spliced to said set of ends.

9. The method according to claim 8, further comprising splicing said opposing ends of said filled-core optical fiber to said set of ends utilizing a fusion splice technique.

10. The method according to claim 9, further comprising placing said filled-core optical fiber under a vacuum and wicking said fluid through said fill hole.

11. The method according to claim 8, further comprising selecting said optical material to be a fluid.

12. The method according to claim 8, further comprising selecting said optical material to be a solid.

13. The method according to claim 8, further comprising forming said fill hole utilizing a focused ion beam or an excimer laser.

14. The method according to claim 8, further comprising sealing said fill hole subsequent to filling said core region with said optical material.

15. The method according to claim 8, further comprising selecting said cladding ring to have an index of refraction higher than an index of refraction of an outer cladding layer and collapsing a portion of said cladding ring during a splicing process for defining said portion of said core region filled with said optical material.

16. The method according to claim 8, further comprising selecting said cladding ring to have an index of refraction lower than an index of refraction of an outer cladding layer and flowing an inert gas through said core region prior to said optical fiber being spliced on opposing ends to said set of ends for avoiding collapsing said core region and said cladding ring during a splicing process.

17. The method according to claim 8, further comprising selecting said cladding ring to have an index of refraction lower than an index of refraction of an outer cladding layer and using a specialized splice recipe for avoiding collapsing said core region and said cladding ring during a splicing process.

18. The method according to claim 8, further comprising selecting said cladding ring to have an index of refraction higher than an index refraction of an outer cladding layer and flowing an inert gas through said core region prior to said optical fiber being spliced on opposing ends to said set of ends for avoiding collapsing core said core region and said cladding ring during a splicing process.

19. The method according to claim 8, further comprising selecting said cladding ring to have an index of refraction higher than an index of refraction of an outer cladding layer and using a specialized splice recipe for avoiding collapsing said core region and said cladding ring during a splicing process.

20. The method according to claim 8, further comprising selecting said cladding ring to have an index of refraction lower than an index of refraction of an outer cladding layer and collapsing a portion of said cladding ring during a splicing process for defining said portion of said core region filled with said optical material.

* * * * *